(12) United States Patent
Nilsson

(10) Patent No.: US 6,435,591 B1
(45) Date of Patent: Aug. 20, 2002

(54) DEVICE FOR AVOIDING WHIPLASH INJURIES

(75) Inventor: Kent Nilsson, Billdal (SE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/380,715

(22) PCT Filed: Mar. 11, 1998

(86) PCT No.: PCT/SE98/00435

§ 371 (c)(1),
(2), (4) Date: Sep. 3, 1999

(87) PCT Pub. No.: WO98/40238

PCT Pub. Date: Sep. 17, 1998

(30) Foreign Application Priority Data

Mar. 11, 1997 (SE) .............................................. 9700907
Jan. 14, 1998 (SE) .............................................. 9800054

(51) Int. Cl.[7] ......................... B60N 2/12; B60N 2/427; B60N 2/42

(52) U.S. Cl. ................. 296/68.1; 297/216.14; 297/216.15; 297/216.16; 297/216.18; 297/216.19

(58) Field of Search .................. 296/68.1; 297/216.1, 297/216.14, 216.15, 216.16, 216.18, 216.19

(56) References Cited

U.S. PATENT DOCUMENTS

| | | | | |
|---|---|---|---|---|
| 2,227,717 A | * | 1/1941 | Jones | 296/68.1 |
| 3,423,124 A | * | 1/1969 | Hewitt | 297/216.19 |
| 3,452,834 A | * | 7/1969 | Gaut | 296/68.1 |
| 3,552,795 A | * | 1/1971 | Perkins et al. | 297/216.18 |
| 3,578,376 A | | 5/1971 | Hasegawa | |
| 3,582,133 A | | 6/1971 | DeLanenne et al | |
| 3,610,679 A | * | 10/1971 | Amato | 296/146.7 |
| 3,731,972 A | * | 5/1973 | McConnell | 297/216.19 |
| 3,732,944 A | * | 5/1973 | Kendall | 297/216 |
| 3,761,127 A | * | 9/1973 | Giese et al. | 296/68.1 |

(List continued on next page.)

FOREIGN PATENT DOCUMENTS

| | | | | |
|---|---|---|---|---|
| JP | 405178437 A | * | 7/1993 | 297/216.18 |
| WO | 9301950 | | 2/1993 | |
| WO | 9422692 | | 10/1994 | |
| WO | 9616834 | | 6/1996 | |
| WO | 9710117 | | 3/1997 | |

OTHER PUBLICATIONS

Steffan et al., "Comparison of Head–Neck Kinematics During Rear End Impact Between Standard Hybrid III, RID Neck, Volunteers, and PMTO's" Proc. Jan. 1995 Int. IRCOBI Conf. on the Biomechanics of Impacts, Brunnen, Switzerland.

Primary Examiner—Joseph D. Pape
Assistant Examiner—Hilary Gutman
(74) Attorney, Agent, or Firm—Klarquist Sparkman, LLP

(57) ABSTRACT

A device for counteracting whiplash injury to a person sitting in a seat (1) which can occur due to a rapid change in velocity, such as a collision, primarily from the rear, or similar. The device is characterized by containing means of allowing controlled displacement of the entire seat (1) against the direction of travel during rapid change of velocity, that the seat (1) is provided with control devices which are arranged to give the seat and its occupant an essentially simultaneous and essentially linear movement against the direction of movement and/or an essentially arcuate movement, and that the seat (1) is arranged to stay in a rear position after the change of velocity.

18 Claims, 6 Drawing Sheets

U.S. PATENT DOCUMENTS

| | | | |
|---|---|---|---|
| 3,802,737 A | | 4/1974 | Mertens |
| 3,858,930 A | * | 1/1975 | Calandra et al. ............ 296/68.1 |
| 3,922,029 A | * | 11/1975 | Urai .......................... 296/68.1 |
| 3,981,520 A | * | 9/1976 | Pulling ...................... 296/68.1 |
| 3,992,046 A | | 11/1976 | Braess |
| 3,998,291 A | * | 12/1976 | Davis ......................... 296/68.1 |
| 4,085,963 A | * | 4/1978 | Bullerdieck ................ 296/68.1 |
| 5,022,707 A | * | 6/1991 | Beauvais et al. ........... 296/68.1 |
| 5,366,269 A | * | 11/1994 | Beauvais ............... 297/216.19 |
| 5,462,333 A | * | 10/1995 | Beauvais ............... 297/216.11 |
| 5,466,001 A | * | 11/1995 | Gotomyo et al. ...... 297/216.12 |
| 5,603,551 A | * | 2/1997 | Sheehan ................ 297/216.19 |
| 5,605,372 A | * | 2/1997 | Al-Abdullateef ......... 297/216.1 |
| 5,626,203 A | * | 5/1997 | Habib ................... 297/216.18 |
| 5,636,424 A | * | 6/1997 | Singer et al. ............. 29/407.01 |
| 5,647,628 A | * | 7/1997 | Pires et al. ................ 296/68.1 |
| 5,810,417 A | * | 9/1998 | Jesadanont ................. 296/68.1 |
| 6,022,074 A | * | 2/2000 | Swedenkelf ........... 297/216.14 |
| 6,033,018 A | * | 3/2000 | Fohl ....................... 297/216.13 |
| 6,053,571 A | * | 4/2000 | Faigle ................... 297/216.13 |
| 6,334,648 B1 | * | 1/2002 | Girsberger et al. .... 297/216.19 |
| 6,340,206 B1 | * | 1/2002 | Andersson et al. .... 297/216.14 |
| 6,354,629 B1 | * | 3/2002 | Andersson et al. .... 297/216.14 |

* cited by examiner

DEVICE FOR AVOIDING WHIPLASH INJURIES

TECHNICAL AREA

This invention refers to a device and a method for counteracting injury to a person sitting in a seat in vehicle, primarily a so called whiplash injury, which can occur due to a rapid change in velocity, such as a collision, primarily from the rear, or similar.

BACKGROUND OF THE INVENTION

A whiplash injury is a soft tissue injury which can occur on account of violent acceleration and/or deceleration applied to the cervical spine. The classic case where these kinds of neck injuries occur is when sitting in a car which is subjected to a rear-end impact, but can also occur in other activities than car driving, such as in participating in certain sports.

According to the Folksam insurance company, 16,000 claims are sent to the insurance companies every year because o rear-end impacts in Sweden alone. Of these cases, 1,500–2,000 sustain permanent injury and 100–200 have to be given a disability pension. Whiplash injury is the most common type or injury resulting in compensation from the insurance companies. When head restraints, popularly termed head rests, became standard in cars, there were considerable hopes that whiplash injuries would disappear. The disappointing result was that the risk of permanent injury only fell by less than 20%, which shows that the problem largely remains.

Several researchers agree that the following factors and situations are of decisive importance for the question of whether a collision will cause whiplash injury or not.

The distance between the head and the head restraint, and the vertical location of the head restraint.

The magnitude of the collision, the crash pulse.

The stiffness of the car. A stiff car gives greater acceleration, and thus higher forces.

The angle of the backrest.

The muscular strength of the individual, in combination with the length of the cervical spine.

If the person is prepared, and tensions his neck muscles back against the head restraint before the collision, the risk of whiplash injury is minimal.

Small children who travel in rearwards-facing child seats are subjected to the same or greater forces in a front-end crash than adults who are subjected to a rear-end collision. Despite this, children seldom suffer from neck injury in a front-end collision. Children very seldom sustain whiplash injuries.

Women are subjected to about a 50% greater risk than men of suffering whiplash injury in a rear-end collision. Statistics from the same type of car (Folksam).

It has been found that the injury frequency is lower in older cars, where the seat backrest collapses in a rear-end collision, compared with newer cars with stronger seats (VTI).

People in the back seat are only subject to half the risk of sustaining neck injuries compared with people in the front seat. This is despite the fact that head restraints are frequently not provided for the rear seats. (Folksam).

"Bouncy" seats entail a greater risk of whiplash injury (Chalmers University of Technology).

About 25% of all whiplash injuries occur in front-end collisions (Folksam).

Passengers in a 4-door Volvo 240 have a 20% higher incidence of whiplash injury compared to passengers in a car which is identical, except that. it only has 2 doors. The only difference is that on the 2-door car, the B pillars are located 270 mm further back, compared with the 4-door model. This affects the position of the upper seat belt anchorage (Folksam).

The last five points indicate that the risk of sustaining a whiplash injury are greatest when the head is thrown forwards as far as it will go (hyperflexion), which occurs after about 400 ms. Regardless of when the injury occurs, the risk is considerably reduced if the acceleration of the seat is minimized.

In recent years, research in this area has been intensified, which has led to new theories and experience related to the cause of whiplash injury. Several theories and initiatives have been found to be incorrect and have therefore now been rejected. This means now that there are old technical solutions which do not solve the problem.

Since the person sits completely still at the start of the crash sequence, the solution should be based on a system or device which reduces the acceleration to less than 4 g, since it has been found that whiplash injury is avoided at accelerations below 4 g. This has been demonstrated in experiments on volunteers (please refer to "Comparison of head-neck kinematics during rear-end impact between standard Hybrid III RID neck, volunteers and pmtos") By allowing the entire seat to move backwards on a sledge-like element in the car during the instant of collision, the acceleration can be reduced to less than 4 g. Through lower acceleration, lower forces are experienced, which leads to a strongly reduced risk of injury.

In crash tests performed by the VOLVO Car Corporation (VOLVO Technology Report on. 2, 1996), acceleration and velocity values in a typical rear-end collision were found to have the values shown in diagrams 1 and 2.

FIGS. 3–8 show the crash sequence in the first 400 milliseconds, where FIG. 3 shows the crash sequence at time 0 milliseconds (ms), where the person is in the initial position and is thus not affected by any acceleration due to collision etc. FIG. 4 shows the crash sequence at a time of 50 ms, when the acceleration has reached its peak after only 10 ms. The speed of the car increases more or less linearly and has reached its top speed after about 50 ms on account of the collision. The body initially moves straight backwards without any mutual displacement of members. At 50 ms, the person's neck muscles begin to tense in a reflex action to counteract the rearwards movement of the person's head. This is regarded as being a decisive factor when the sequence is studied. All studies involving acceleration greater than 5 g have been a cone on dummies, cadavers etc. FIG. 5 shows the crash sequence at a time of about 100 ms, when the relative movement begins. The shoulders stop and the head and lower body continue to move backwards. This has been proven by researchers at the Chalmers University of Technology and others. They found that this is because the backrest is stiffer at the top, due to the cross beam in the backrest frame which unites the right and left sides of the backrest. At the same time, the mass of the body is greater in the pelvic area than in the shoulder area. There are theories that whiplash injury is caused by this effect, due to the rapid increase in pressure in the cervical spinal canal, which occurs when the head moves backwards and the volume of the cervical spinal canal decreases in a very short space of time due to the extension. This leads to an increase in pressure in the cervical spinal canal which can cause bleeding in the blood vessels around the spinal canal (myelorrhagia). Experiments have been performed on pigs at Chalmers University of Technology, in which the increase in pressure in the cervical spinal canal due to forced rapid extension was measured. Another probable source of injury would be the damage caused by the shear stress in the neck, which occurs when the head wants to move back relative to the shoulders. This effect is similar to a pack of cards lying on a table when you move the upper part of the pack sideways. The cards illustrate the disks in the cervical spine. Between 100–200 ms, the neck muscles have reached their maximum force in trying to stop the rearwards movement of the head. This muscle force represents a bending moment equivalent to a force of up to 300 N at eye height. FIG. 6 shows the crash sequence at 200 ms when the head has moved back as far as it goes, relative to the backrest and head restraint. The neck muscles are still at maximum tension. The backrest and head restraint are bent back to a maximum, and like a big spring, they will soon throw the head and torso forwards with great force. FIG. 7 shows the crash sequence at 300 ms, when the head has about twice the speed of the car and seat. The neck muscles are still at maximum tension, which means that the acceleration of the head continues. It is probable that the head reaches nearly three times the speed of the car and seat when the backrest is "bouncy". This is because the backrest and neck muscles interact in an unfortunate manner. FIG. 8 shows the crash sequence at about 400 ms, when the head reaches its normal stopping point. The torso suddenly stops when it meets the stiff seat belt. At this time, the head continues forwards, with considerable over-extension. Several facts indicate that it is here that the whiplash injury occurs. This would explain the whiplash injuries which occur in front-end collisions and would also explain why the incidence of whiplash injury in a 4-door Volvo 240 is higher than in a 2-door, during a rear-end impact.

From this reasoning follows the thesis that it is very important to reduce the acceleration and thus to reduce the forces in a rear-end car collision. One way to do this is to allow the entire seat to move backwards in the car, in a controlled and damped movement, where the seat remains in a rearward position.

One solution is demonstrated in WO 96/16834, which is mainly based on backrest movement. The solution lacks a trigger mechanism, whose purpose is to release the rearward movement. This gives the seat a purely linear movement, which would appear to be parallel with the floor of the car, and is only intended to delay the time until the occupant's head contacts the head restraint. It can primarily be described as a spring which gives a forward and rearward movement. Dampers and plasticizing solutions are described, however. No linear-arctuate movement or trajectory are described. The entire solution in WO 96/16834 is based on the assumption that the occupant's back, neck and head are not supported and will be subjected to a considerable impact with a certain delay, because of the force against the backrest, which could cause a whiplash injury. The occupant and the seat are initially at rest, with no other forces acting upon them than gravity. When the floor of the car suddenly begins to accelerate, the back and backrest are carried along as well. The present invention and the invention described in WO 96/16834 do not have the same assumption about the fundamental reasons for why whiplash injury occurs. This means that the solution presented in WO 96/16834 is intended to solve a problem which is not foreseen in this invention.

The invention in U.S. Pat. No. 3,992,0.46 is intended to reduce injury in a rear-end collision. This invention is also largely based on linear movement in parallel with the floor of the car. The invention in U.S. Pat. No. 3,992,046 and the present invention do not solve the same problem, since one refers to front-end collisions and the other refers to rear-end collisions.

The invention in WO 93/01950 is also only intended to reduce injury in front-end collisions. The invention lacks a trigger mechanism and is based on a seat track which differs from the present invention. In addition, the invention in WO 93/01950 does not remain in its triggered position after it has been triggered.

The invention in U.S. Pat. No. 3,802,737 is a totally different technical solution. In that solution, the head restraint has a higher acceleration than the floor. The present invention is based on the opposite principle, i.e. it reduces the acceleration of the head restraint. The solution in U.S. Pat. No. 3,802,737 is mainly based on deformable sections in the backrest. In that solution, the head restraint is moved backwards and upwards in the car. In the present solution, the movement is backwards and downwards, or movement backwards at the same time as the front of the seat moves upwards.

The above description of previously-known technology gives a collection of inventions which all refer to some extent to injuries sustained in collisions. Another major and important difference consists of the problems which these inventions are intended to solve. In this connection, it is important to point out that one consequence of intensified research in this field is increased knowledge about whiplash injuries and their origins, which has led to and constantly leads to new problem formulations and deeper nuances of old problem formulations. This means that there are considerable differences between current problem formulations and old ones.

THE PURPOSE AND MOST IMPORTANT CHARACTERISTICS OF THE INVENTION

The fact that the mechanisms of the car, the seat and the head restraint all interact with the neck muscles is a phenomenon which has not previously been studied in depth. Almost all studies involving acceleration greater than 5 g have been done on dummies or cadavers, which is obviously a limitation in this area. New results indicate, as noted above, that: it is the interaction between the occupant and the seat which cause whiplash injuries. The main purpose of the invention is to reduce the acceleration to which the body is subjected after the incidence of the collision to less than 4 g, since it has been found that whiplash injuries occur in collisions exceeding 5 g.

These new findings, combined with this invention, will lead to fewer injuries. The purpose of this invention is achieved through a device and a method intended to counteract the occurrence of whiplash injury to a person sitting in a seat, which could occur through a rapid change in velocity, such as in a collision essentially from the rear or similar. The characteristics of this invention are that the arrangement contains a means whereby the seat will move in a controlled manner against the direction of movement during a change in velocity, and that the seat is provided with guidance devices which are intended to give the seat and the person sitting in it an essentially simultaneous and essentially linear movement against the direction of movement and/or an essentially arcuate movement, and that the seat is arranged so that it will remain in its rearward position after the change in velocity.

When the seat moves backward, there is a risk that it will collide with a knee belonging to a rear-seat passenger. This can be reduced if the seat is given extra inclination when the device is triggered, which leads to a reduction in injury of the rear-seat passengers.

These purposes have been solved in this invention, by means of the characteristics described in the patent claims.

DESCRIPTION OF THE DRAWINGS

The invention will be described below with reference to the preferred embodiments shown in the attached drawings.

DESCRIPTION OF PREFERRED EMBODIMENTS

Figure 9:
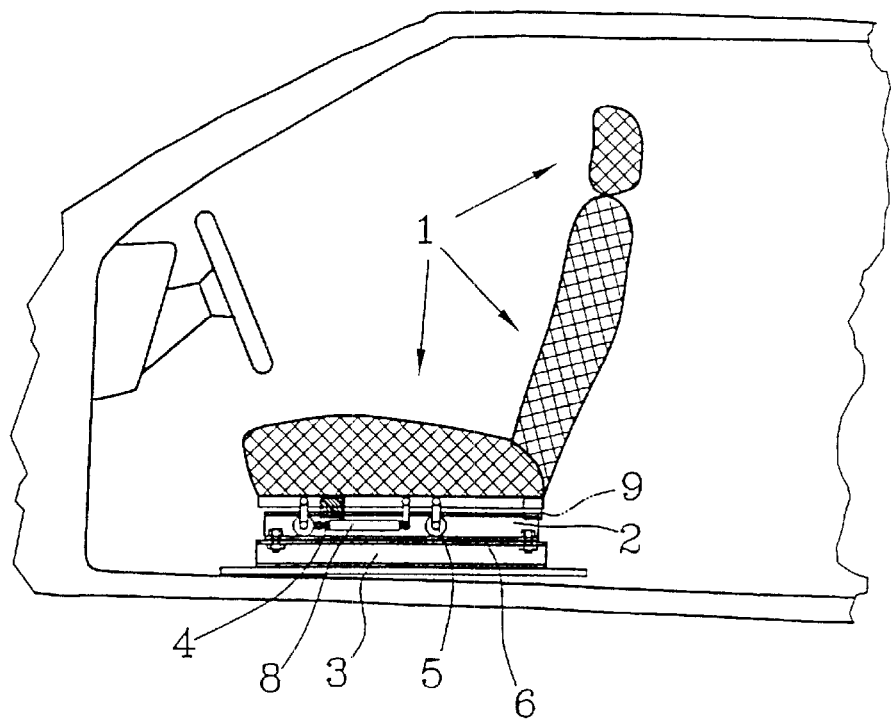
FIG. 9 shows a preferred embodiment of a device, in untriggered position, intended to reduce injury, mainly the so called whiplash injuries referred to in the description of the invention.
Figure 10:
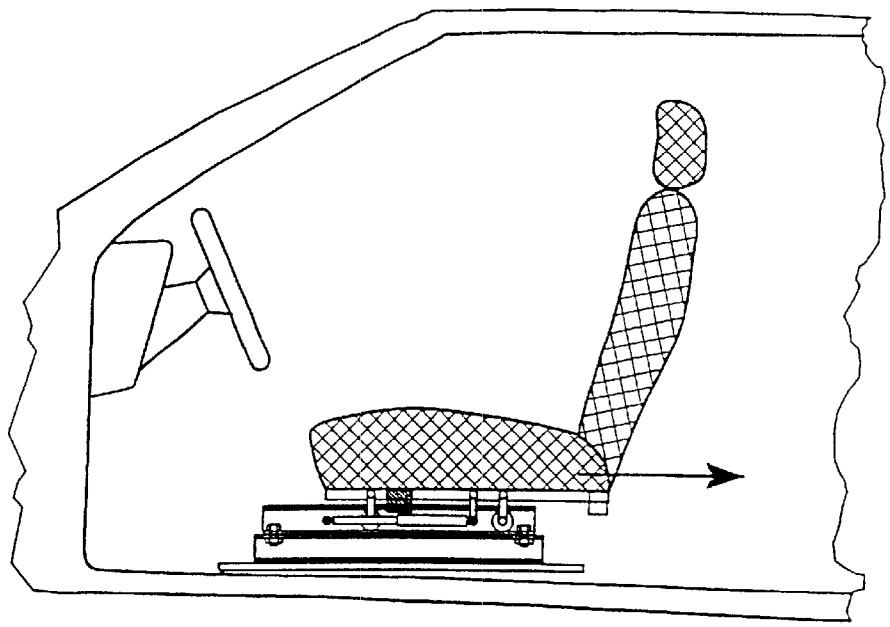
FIG. 10 shows a preferred embodiment of the same device as in FIG. 1, but in the triggered position.

The preferred embodiment in FIGS. 9–12 illustrate implementations in the motor vehicle field, more specifically in a passenger car. It should be noted that the invention is also intended for use in buses etc. although the description primarily refers to the use of the invention in passenger cars. The concept of "against the direction of travel" refers to the direction in which the car normally moves when it reverses. The first preferred embodiment in FIG. 9 shows a device intended to reduce injury, mainly the so-called whiplash injuries referred to in the description of the invention, sustained by a person sitting in seat 1, which could be caused by a sudden change in velocity, such as in a collision essentially from the rear or similar. Its technical composition contains a means which permit controlled movement of the entire seat 1 or sections thereof, during a change in velocity, against the direction of travel and upwards or downwards. Seat 1 is provided with a guidance element, which is arranged to give the seat and its occupant an essentially simultaneous and essentially linear movement against the direction of travel and/or an essentially arcuate movement.

The purpose of the arcuate movement is to arrange the seat in a position which is associated with a lower risk of sustaining whiplash injury. The characteristic of this position is that the seat takes up an inclined position such that the rearward inclination of seat 1 is greater than the inclination of the seat in the normal case. The arcuate movement which results from the leaning position can be achieved by a number of different means.

In general, at the end of the movement, the rear of the seat is closer to the floor of the car in relation to the front of the car. It is the relative movement in height between the front section and the rear section of the seat which provides this effect. The movement can be implemented in a number of different ways:

The front section of the seat moves upward at the same time as the entire seat moves backward in the horizontal direction.

The rear section of the seat moves downward at the same time as the entire seat moves backward in the horizontal direction.

Both the front section and the rear section of the seat move downward, but the rear section moves down more than the front section, at the same time as the entire seat moves backward in the horizontal direction.

Both the front section and the rear section of the seat move upward, but the front section moves up more than the front section, at the same time as the entire seat moves backward in the horizontal direction.

The front section of the seat moves upward at the same time as the rear section of the seat moves downward, at the same time as the entire seat moves backward in the horizontal direction.

(Downward refers to a direction aligned essentially at right angles towards the floor of the vehicle) Upward refers to the opposite direction.

The desired inclination of the seat can be achieved by a number of solutions. One way is to design a arctuate section, such as part of an arc of constant or varying radius. This section can be connected to an essentially straight segment. The preferred embodiment has been implemented as an intermediate section 2 (also called centre section), fixed between the ordinary attachments 3 of the seat 1 on the floor of the car. The seat 1 can not move backwards and upwards/downwards until the trigger mechanism 4 has tripped. The backwards movement is facilitated by fixing a rolling device 5, such as wheels, to seat 1 and allowing these to roll along one or several tracks 6 in the preferred embodiment. It should be noted that neither intermediate section 2 nor tracks 6 necessarily have to be made in one piece, they could very well consist of four sections, for example, each containing one rolling device, whose extent and size are such that each rolling device can move in such a way that the purpose of the invention is achieved.

Figure 15:
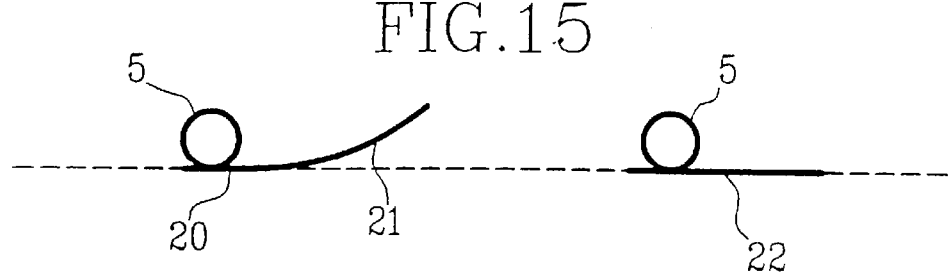
FIGS. 15–19 show preferred embodiments of different variants of the way in which the tracks can be designed to give the seat a rearward inclination.

Since the rearward inclination of the seat after the device has triggered is of central importance to the invention, a description of how this can be technically achieved is attached. FIGS. 15–19 contain schematic diagrams illustrating critical sections of rolling device 5 and the design of track 6. The front section of the seat is on the left of the figures. The device is shown in the figures in the untriggered position. It should be noted that all figures show a horizontal orientation of track 6, seen from the movement of rolling device 5. It is not necessary for the track to consist of single elements, it can consist of two or more track elements whose purpose is to support rolling device 5 when it moves, as shown in the figure. FIG. 15 illustrates how the front section of the track shows an essentially horizontal segment 20, attached to a segment 21 which is bent upwards and a rear track section with an essentially horizontal segment 22.

Figure 16:
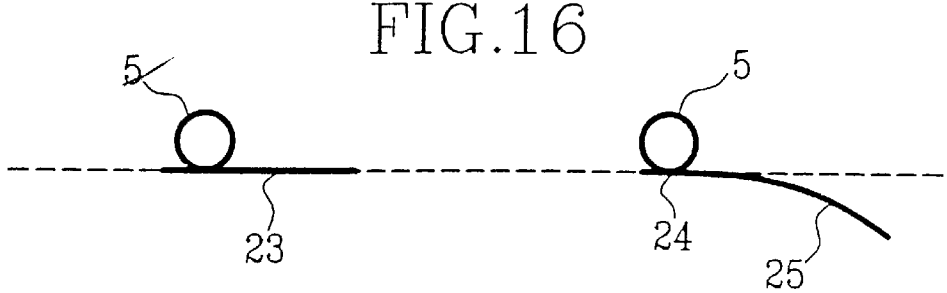

FIG. 16 illustrates how the front section of the track shows an essentially horizontal segment 23 and a rear track section with an essentially horizontal segment 24, attached to a segment 25 which is bent obliquely downward.

Figure 17:
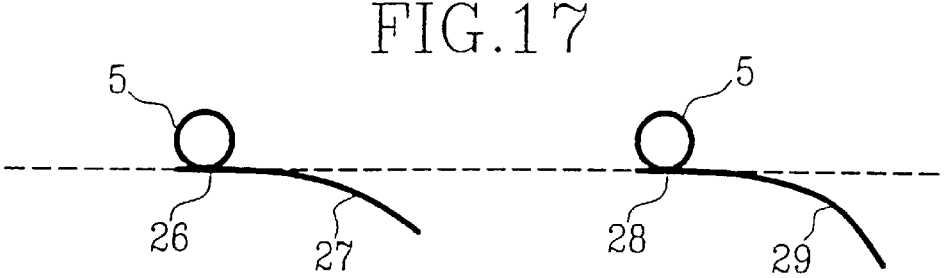

FIG. 17 illustrates how the front section of the track shows an essentially horizontal segment 26 attached to a segment 27 which is bent obliquely downward and a rear track section with an essentially horizontal segment 28, attached to a segment 29 which is bent obliquely downward. The difference between segments 27, 29 which are bent downward, is that the rear one 29 is bent downward more than the front one 27.

Figure 18:
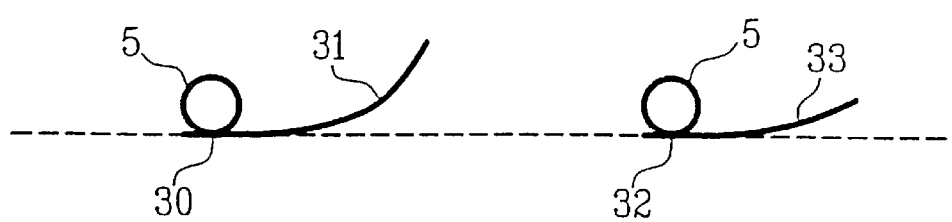

FIG. 18 illustrates how the front section of the track shows an essentially horizontal segment 30 attached to a segment 31 which is bent obliquely upward and a rear track section with an essentially horizontal segment 32, attached to a segment 33 which is bent obliquely upward. The difference between segments 31, 33 which are bent upward, is that the front one 31 is bent upward more than the rear one 33.

Figure 19:
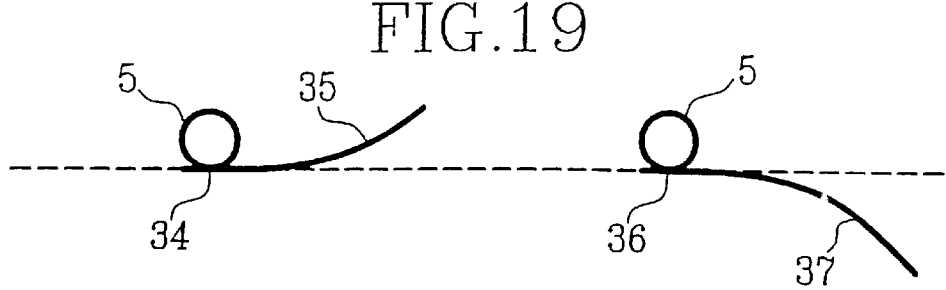

FIG. 19 illustrates how the front section of the track shows an essentially horizontal segment 34, attached to a segment 35 which is bent obliquely upward, and a rear track section with an essentially horizontal segment 36, attached to a segment 37 which is bent obliquely downward.

The use of these track configurations will lead to seat 1 taking up a more rearward position after the device has triggered than before it has triggered. It should be noted that the essentially horizontal segment in FIGS. 15–19 can be omitted to allow seat 1 to begin to move upward/downward at once when the device has triggered, which also leads to rearward movement. In addition, it is possible to give the essentially horizontal segment a certain inclination. One purpose of the essentially horizontal segments is to brake the seat during the time that seat 1 is moved. Braking will cause the head of the occupant to come into contact with the head restraint, which will catch up the head and give it support during continued movement of seat 1 upward or downward, depending on the track configuration chosen as above.

The trigger mechanism 4 can be of a previously known type. It can be triggered by force, acceleration etc. During movement of seat 1 backward and upward/downward, the movement is damped so that the occupant of seat 1 is not subjected to the same change of velocity to which the car or bus is otherwise subjected. At the end of the rearward movement, the seat thus takes up a position which is more rearwardly inclined than was the case before the seat 1 was triggered.

Seat 1 is designed to remain in the rearward position after the change of velocity. However, slight forward motion due to the seat backrest springing back from a state of elastic deformation is not prevented.

Figure 4:
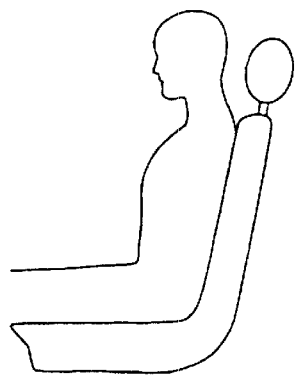
Figure 5:
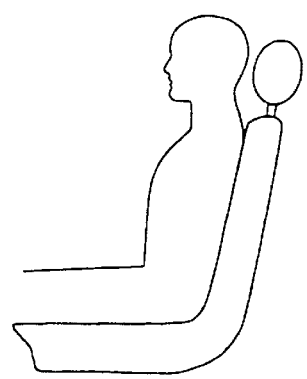
Figure 6:
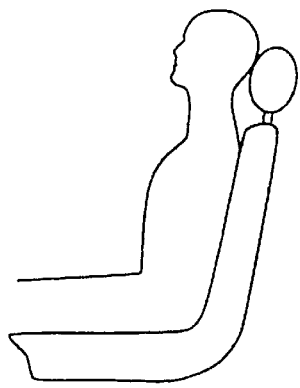
Figure 7:
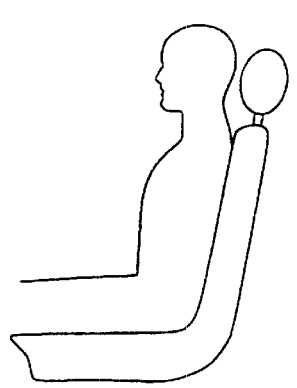
Figure 8:
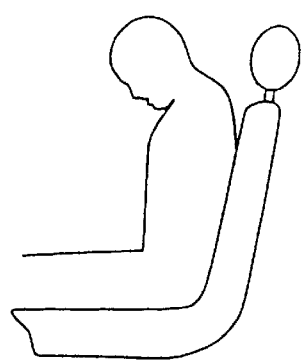

Damping of the movement is achieved by means of one or several damping devices, such as one or several traditional shock absorbers 8 or one or several dampers whose damping effect is a function of acceleration or movement. An alternative way of implementing a damping device could be to use assemblies containing plasticizing elements, which plasticize on triggering. FIG. 4 shows seat 1 after the triggering device 4 has triggered and the seat 1 has been moved rearward.

Figure 1:
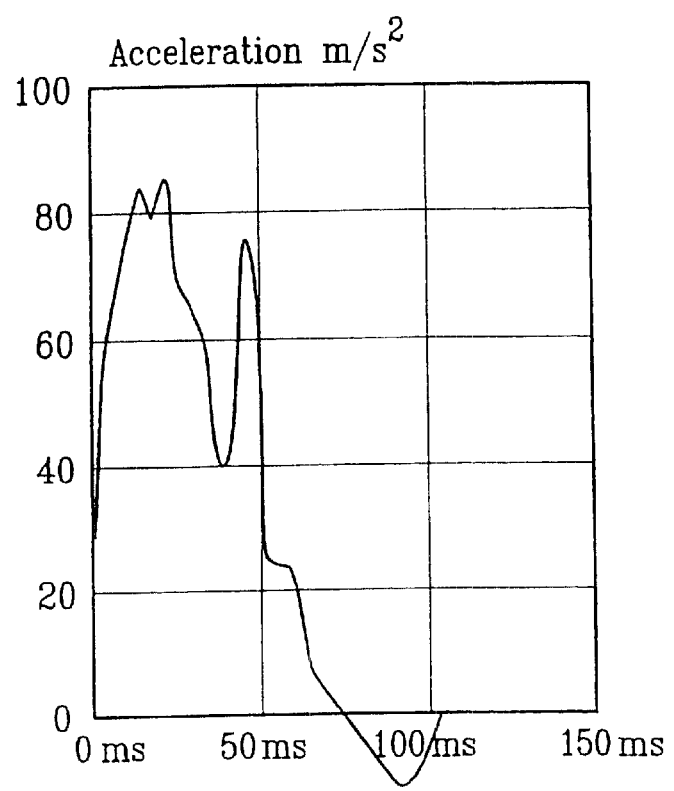
FIGS. 1 and 2 show the values of acceleration and velocity during a typical rear-impact collision.
Figure 2:
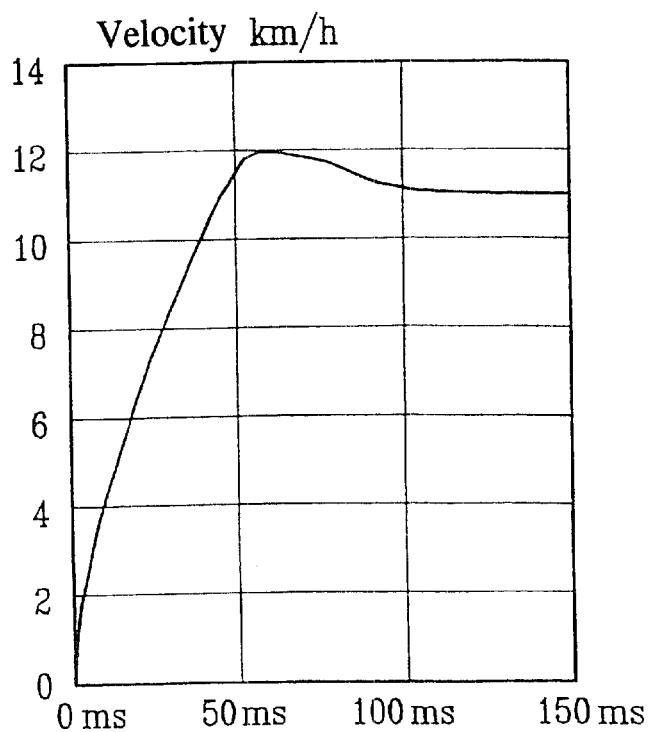
Figure 3:
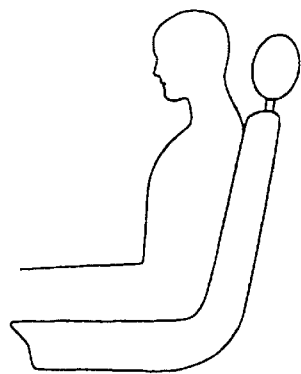
FIGS. 3–8 show the crash sequence during the first 400 milliseconds.

An analysis of the design of this seat is given by reference to the two examples given below, please refer to FIGS. 1 and 2, where a, v, t, F and m s correspond to units of acceleration, velocity, time, force, mass, and distance respectively.

A first example demonstrating the capacity of the present invention to reduce the acceleration of a seat contained within a vehicle acted upon by an external force is as follows. Where $a=\Delta v/\Delta t$, $\Delta v=11$ km/h=3.06 m/s, and $\Delta t=0.05$ s, $a=(3.06$ m/s$)/(0.05$ s$)=61$ m/s$^2$. Hence, a body which is accelerated from rest to a velocity of 11 km/h in 0.05 seconds is exposed to an acceleration of 61 m/s$^2$. Assuming constant acceleration where $v_{avg}=(v_{initial}+v_{final})/2$, the distance the body travels during this time is given by the relationship $s=v_{avg}*t=[(3.06$ m/s$)/2]*0.05$ s=0.0765 m. Hence, a body which is accelerated from rest at 61 m/s$^2$ to a velocity of 11 km/h travels a distance of 0.0765 m in 0.05 seconds. If the present invention moves the seat backward 90 mm (0.09 m) during the rear-end impact the acceleration will occur over a total distance equivalent to 0.0765 m+0.09 m=0.1665 m. Similarly, the time over which the acceleration will occur is extended as determined by $t=s/v_{avg}=0.1665$ m/$[(3.06$ m/s$)/2]=0.1085$ seconds. The extended distance and time over which acceleration occurs corresponds to an acceleration calculated as $a=\Delta v/\Delta t=(3.06$ m/s$)/0.1085$ s=28 m/s$^2$. Hence, the present invention reduces acceleration from 61 m/s$^2$ to 28 m/s$^2$, i.e. by 54%. At a result, a person sitting in the seat is subjected to 54% less force during the rear-end impact.

A second example demonstrating the capacity of the present invention to reduce the acceleration of a seat contained within a vehicle acted upon by an external force from 10 g to 4 g is as follows. In a relatively heavy collision, velocity increases from 0 km/h to 18 km/h in 50 ms. Where $a=\Delta v/\Delta t$, $\Delta v=18$ km/h=5 m/s, and $\Delta t=0.05$ s, $a=(5$ m/s$)/(0.05$ s$)=100$ m/s$^2$. Hence, a body which is accelerated from rest to a velocity of 18 km/h in 0.05 seconds is exposed to an acceleration of 100 m/s$^2$ or approximately 10 g's. Assuming constant acceleration where $v_{avg}=(v_{initial}+v_{final})/2$, the distance the body travels during this time is given by the relationship $s=v_{avg}*t=[(5$ m/s$)/2]*0.05$ s=0.125 m. Hence, a body which is accelerated from rest at 100 m/s$^2$ to a velocity of 18 km/h travels a distance of 0.125 m in 0.05 seconds. If acceleration is limited to 4 g's=39.2 m/s$^2$, the time to reach a velocity of 5 m/s is given by $\Delta t=\Delta v/a=(5$ m/s$)/(39.2$ m/s$^2)=0.127$ seconds. Similarly, the distance traveled to reach a velocity of 5 m/s at an acceleration of 39.2 m/s$^2$ is given by $s=v_{avg}*t=[(5$ m/s$)/2]*0.127$ s=0.32 m. The seat movement required to reduce acceleration of the seat from 10 g's to 4 g's is equal to the difference between the 4 g and 10 g deceleration distances, or 0.32 m−0.125 m=0.195 m.

If the seat moves back 195 mm, the acceleration is reduced from 10 g to 4 g. If the seat moves a shorter distance in an initially linear movement which is then transformed into a circular movement, this means that the head restraint moves 195 mm, the same effect is obtained at the same time as the risk of hitting one of the rear seat passengers is reduced. The controlled change of position of the entire seal 1 during a change of velocity is arranged to be limited to 20–400 mm, i.e. the least change of movement in one application can be 20 mm and the greatest change in another implementation can be 400 mm.

A sensor 9 is arranged to detect the position of an impeding person, etc. behind the seat 1 in question. The sensor 9 can be of the IR type or of any other suitable type. Its purpose is to limit or check the change in position. If a person is sitting behind the relevant seat 1 when a collision occurs, this person will be subjected to a risk of injury by the rearward-moving seat 1, so it is important to be able to limit the rearward movement to reduce the risk of injury. It is also conceivable that the rearward movement could be completely prevented.

Figure 11:
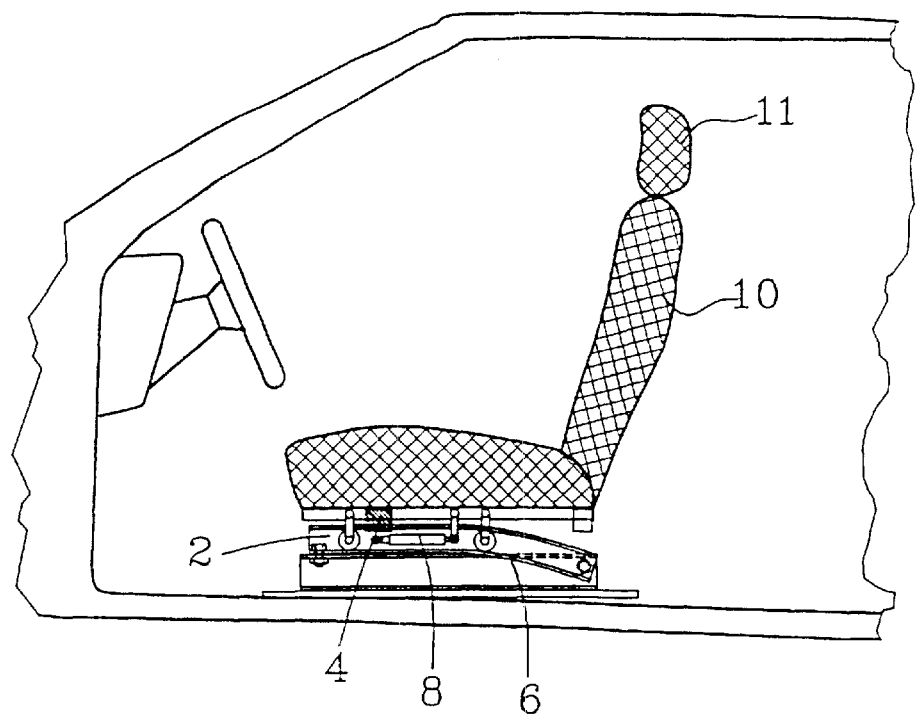
FIG. 11 shows an alternative preferred embodiment, in untriggered position, intended to reduce injury, mainly the so called whiplash injuries referred to in the description of the invention.
Figure 12:
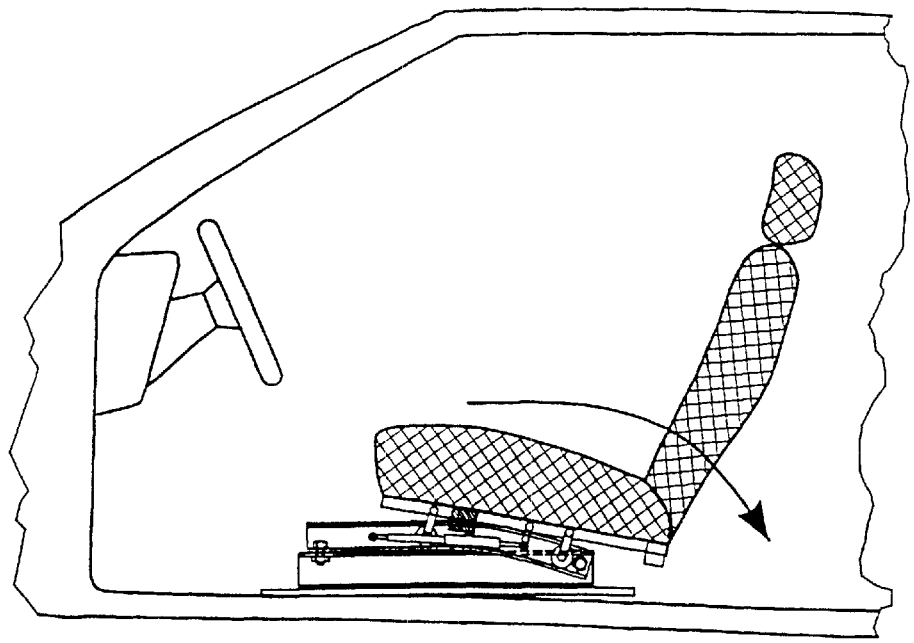
FIG. 12 shows a preferred embodiment of the same device as in FIG. 11, but in the triggered position.

The preferred embodiment shown in FIG. 11 also illustrates an application in the automotive, field. This example shows considerable similarities to the previous example, so only the differences between them will be described. In this example, track 6 in intermediate section 2 is not essentially completely straight as in the example above, it is also curved. Track 6 in centre section 2 can comprise one or several track segments, including one or more arc sections with constant or varying radius which give the desired shape of track 6. The effect of the curved track 6 is to give seat 1 an inclination in its rearward position, as shown in FIG. 12. This means that an inclination is given to seat 1 and other sections such as backrest 10, head restraint 11 etc. This embodiment can be modified by using a number of different tracks instead of a single track.

This embodiment and the previous embodiment can also be designed so that seat 1 together with the device in the preferred embodiment moves backward after triggering. it should be pointed out that section 2 can be made thinner than shown in FIGS. 9, 10, 11 and 12. This means that the drawings are to be regarded as being principle sketches.

Figure 13:
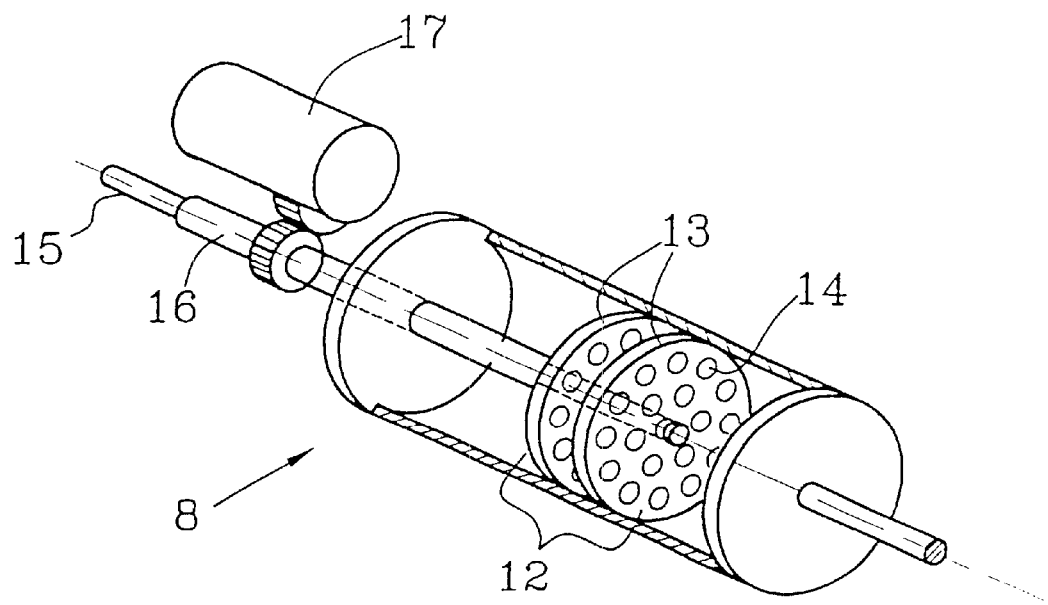
FIG. 13 shows how a shock absorber with adjustable damping effect can be constructed by means of two disks provided with holes.

An example of another shock absorber is shown in FIG. 13. The damping function of the shock absorber 8 can also be arranged to vary according to the force/acceleration measured by such means as an accelerometer. The accelerometer could be contained in the triggering device 4 and indicates the magnitude of the acceleration of the vehicle, which is subjected to a collision or similar. Once the magnitude of the acceleration has been determined, a control unit sets the shock absorber in such as way as to provide a suitable level of damping. The accelerometer and the control unit can be arranged in or adjacent to the shock absorber 8. This can be implemented by providing piston 12 in damper 8 with at least two disks 13, each provided with at least one hole 14. Adjustable damping is obtained as a function of the mutual angle of the two disks 13. When the holes 14 in disks 13 overlap each other, less damping is obtained and when the holes 14 overlap to a lesser extent, more damping is obtained. FIG. 13 shows an example containing two disks 13. One way to arrange the setting of the disks 13 is to have at least one of the disks 13 fixed to the shaft 15 of the shock absorber 8 and at least one disk 13 fixed at some angle to sleeve 16 of shock absorber 8, which means that rotation of sleeve 16 by means of motor 17 provides adjustment of the damping. The damping is primarily intended to be only set once and then to be essentially constant during the rest of the damping sequence. Setting takes place before or during the start of the rearwards movement.

Figure 14:
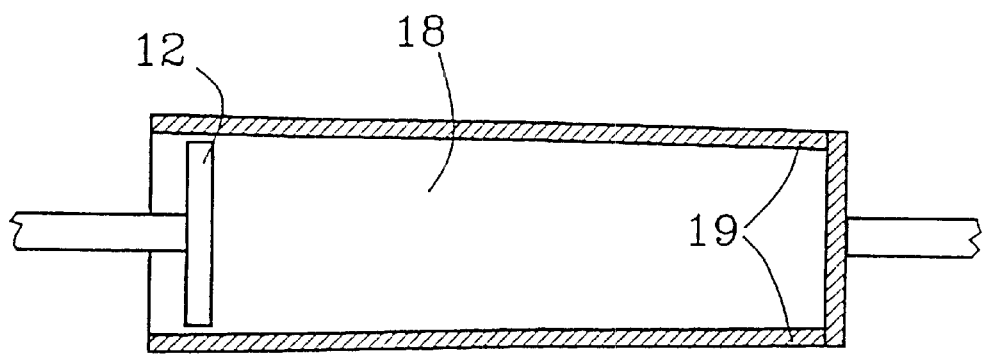
FIG. 14 shows a preferred embodiment of how a shock absorber with adjustable damping can be constructed by means of a tapering space for the damping piston.

FIG. 14 shows another way to implement damping. It is based on designing the shock absorber to give increased damping as the damping movement progresses. The goal is to give the person in seat 1 more gentle braking. The gentler braking is mainly achieved by arranging the volume 18 in which the damping piston 12 moves to have a narrowing cross section 19 in the direction of movement of piston 12. This narrowing cross section 19 means that damping increases progressively.

The change in position of seat 1 or parts thereof essentially takes place at the same time as the change in velocity caused by a collision.

One problem associated with whiplash injuries is multiple-car crashes, where the passenger's head is first thrown back, and then when the car collides with the car in front, the head is thrown forwards. In such an event, the currently proposed invention functions excellently and the seat moves back and forwards in a controlled manner to reduce the deceleration during impact with the car in front.

It should be mentioned that the location of the triggering device, sensors and shock absorber can be arranged in a number of different configurations within the framework of the patent claims, and that their location in the figures are to be regarded as being examples. In addition, the invention should be arranged so that the unction of the seat belt and the normal adjustment of the seat are not affected, and they should function normally. Since the seat belt is mounted on the seat and not on the floor, the seat belt will function during the entire crash sequence.

What is claimed is:

1. A device for preventing the occurrence of whiplash injuries to an occupant of a vehicle having front and back ends, said device comprising:

a seat having front and rear sections, the seat being mounted to the vehicle; and at least two rolling devices attached to the seat; and at least one track having front and rear track sections, one of the rolling devices positioned in the front track section and one of the rolling devices positioned in the rear track section and wherein at least one of the track sections has an arcuate shape; and wherein in response to a collision of the vehicle, the seat moves towards the back end of the vehicle and in an accruate motion in accordance with the movement of the rolling devices in the front and rear track sections; and wherein as a result of the arcuate motion of the seat, the seat has a rearward inclination, and wherein both the front section and the rear section move downward, but the rear section moves downward a greater distance than the front section, simultaneously as the seat moves backward in a horizontal direction, thereby resulting in the rearward inclination of the seat.

2. The device according to claim 1 wherein the front track section comprises an arcuate section of constant or varying radius.

3. The device according to claim 1 wherein the rear track section comprises an arcuate section of constant or varying radius.

4. The device according to claim 1 further comprising a triggering mechanism coupled to the seat and arranged to sense the forces or accelerations acting upon the vehicle, wherein if a set force or acceleration is exceeded, the triggering mechanism permits a linear and arcuate movement of the seat.

5. The device according to claim 1 further comprising at least one dampening element to dampen linear and arcuate movement of the seat in at least one direction.

6. The device according to claim 1 when utilized in an application which might allow an individual to be present behind the seat during normal operation, further comprising a sensor arranged to detect the position of the individual, wherein the sensor limits or checks the linear and arcuate movement of the seat.

7. The device according to claim 1 wherein the track sections are shaped to initially give the seat a linear motion against a direction of travel, followed by a swinging, rearward-inclining movement.

8. The device according to claim 1 further including means to damp a change in position of the seat.

9. The device according to claim 1 further including a sensor to detect a person located behind the seat and further including means that, in response to detecting the person, limit or prevent a change of position of the seat.

10. A device for preventing the occurrence of whiplash injuries to an occupant of a vehicle having front and back ends, said device comprising:

a seat having front and rear sections, the seat being mounted to the vehicle, and at least two rolling devices attached to the seat; and at least one track having front and rear track sections, one of the rolling devices positioned in the front track section and one of the rolling devices positioned in the rear track section and wherein at least one of the track sections has an arcuate shape; and wherein in response to a collision of the vehicle, the seat moves towards the back end of the vehicle and in an arcuate motion in accordance with the movement of the rolling devices in the front and rear track sections, and wherein as a result of the arcuate motion of the seat, the seat has a rearward inclination, and wherein both the front section and the rear section move upward, but the front section moves up more than the rear section, simultaneously as the seat moves backward in a horizontal direction, thereby resulting in the rearward inclination of the seat.

11. The device according to claim 10 wherein the front track section comprises an arcuate section of constant or varying radius.

12. The device according to claim 10 wherein the rear track section comprises an arcuate section of constant or varying radius.

13. The device according to claim 10 further comprising a triggering mechanism coupled to the seat and arranged to sense the forces or accelerations acting upon the vehicle, wherein if a set force or acceleration is exceeded, the triggering mechanism permits linear and arcuate movement of the seat.

14. The device according to claim 10 further comprising at least one dampening element to dampen linear and arcuate movement of the seat in at least one direction.

15. The device according to claim 10 when utilized in an application which might allow an individual to be present behind the seat during normal operation, further comprising a sensor arranged to detect the position of the individual, wherein the sensor limits or checks linear and arcuate movement of the seat.

16. The device according to claim 10 wherein the track sections are shaped to initially give the seat a linear motion against a direction of travel, followed by a swinging, rearward-inclining movement.

17. The device according to claim 10 further including means to damp a change in position of the seat.

18. The device according to claim 10 further including a sensor to detect a person located behind the seat and further including means that, in response to detecting the person, limit or prevent a change of position of the seat.

* * * * *

UNITED STATES PATENT AND TRADEMARK OFFICE
CERTIFICATE OF CORRECTION

PATENT NO.    : 6,435,591 B1
DATED         : August 20, 2002
INVENTOR(S)   : Kent Nilsson It is certified that error appears in the above-identified patent and that said Letters Patent is hereby corrected as shown below:

Column 1,
Line 6, "in vehicle" should be -- in a vehicle --.
Line 21, "o" should be -- of --.
Line 33, "." should be -- : --.
Line 55, "Statistics from the same type of car (Folksam)." should be
-- (as reported by Folksam, a Swedish insurance company). --.
Line 59, "(VTI)" should be -- (as reported by the Swedish Road and Transport Institute) --.
Line 63, "(Folksam)" should be -- (as reported by Folksam) --.
Line 65, "(Chalmers University of Technology)" should be
-- (as reported by Chalmers University of Technology) --.
Line 67, "(Folksam)" should be -- (as reported by Folksam) --.

Column 2,
Line 7, "(Folksam)" should be -- (as reported by Folksam) --.
Line 51, "a cone" should be -- done --.

Column 3,
Line 51, "linear-arctuate" should be -- linear-arcuate --.

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,435,591 B1
DATED : August 20, 2002
INVENTOR(S) : Kent Nilsson

It is certified that error appears in the above-identified patent and that said Letters Patent is hereby corrected as shown below:

Column 3,
Line 66, "3,992,0.46" should be -- 3,992,046 --.

Column 4,
Line 44, "that: it" should be -- that it --.

Column 5,
Line 40, "embodiment" should be -- embodiments --.

Column 6,
Line 19, "front" should be -- rear --.
Line 29, "a arctuate" should be -- an arcuate --.
Line 35, "can not" should be -- cannot --.

Column 8,
Line 14, "At" should be -- As --.
Line 26, "$v_{avg} = (v_{initial} + v_{final})/^2$" should be -- $v_{avg} = (v_{initial} + v_{final})/2$ --.
Line 61, "automotive, field" should be -- automotive field --.

Column 9,
Line 10, "it" should be -- It --.
Line 22, "as way" should be -- a way --.
Line 65, "unction" should be -- function --.

Column 10,
Line 17, "accruate motion" should be -- arcuate motion --.

Signed and Sealed this

Twenty-ninth Day of July, 2003

JAMES E. ROGAN
*Director of the United States Patent and Trademark Office*